Feb. 27, 1940.  R. CLADE  2,191,815
LUBRICATED TANK VALVE
Filed Nov. 6, 1937  3 Sheets-Sheet 1
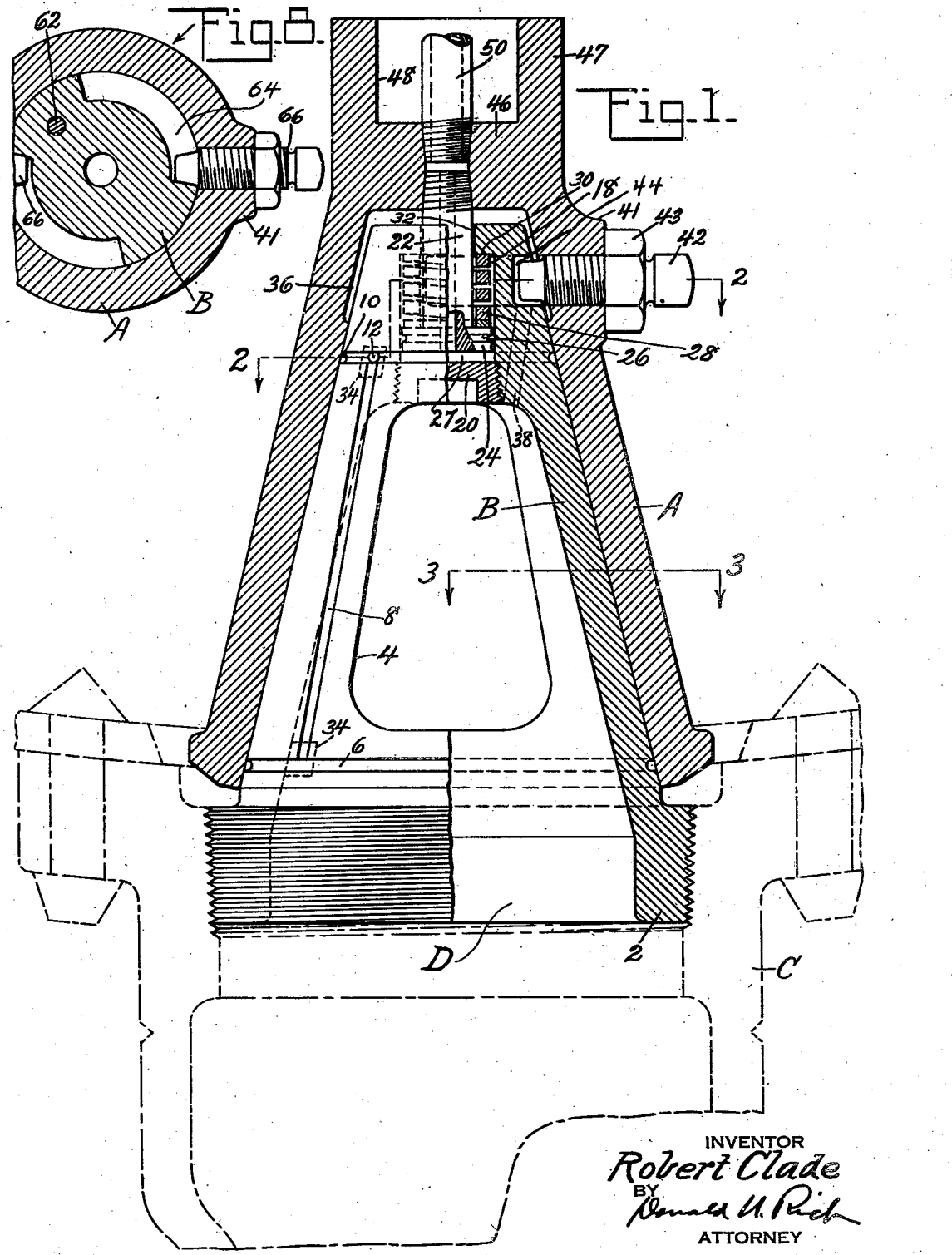
INVENTOR
Robert Clade
BY
ATTORNEY

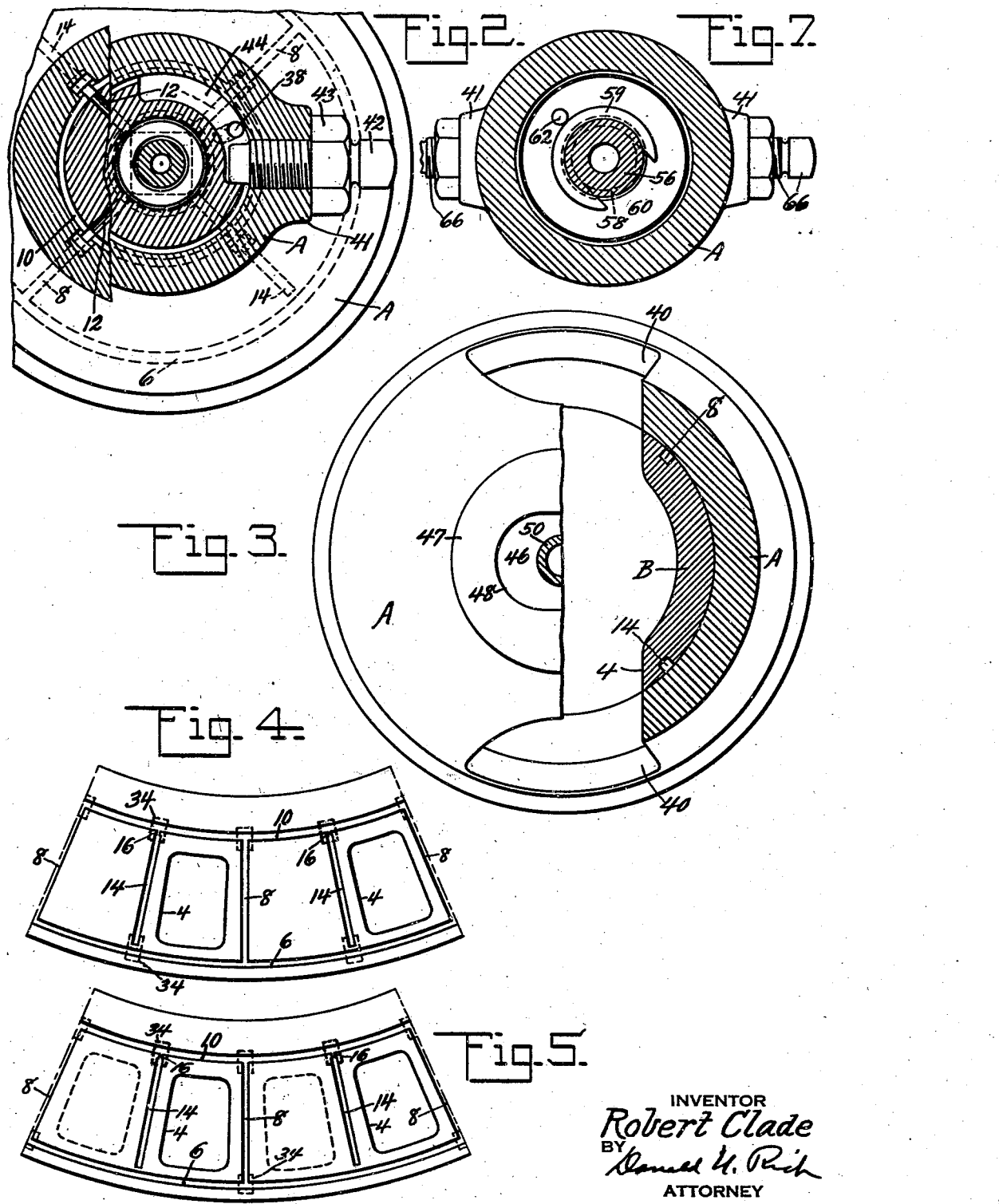

Feb. 27, 1940. R. CLADE 2,191,815
LUBRICATED TANK VALVE
Filed Nov. 6, 1937 3 Sheets-Sheet 3
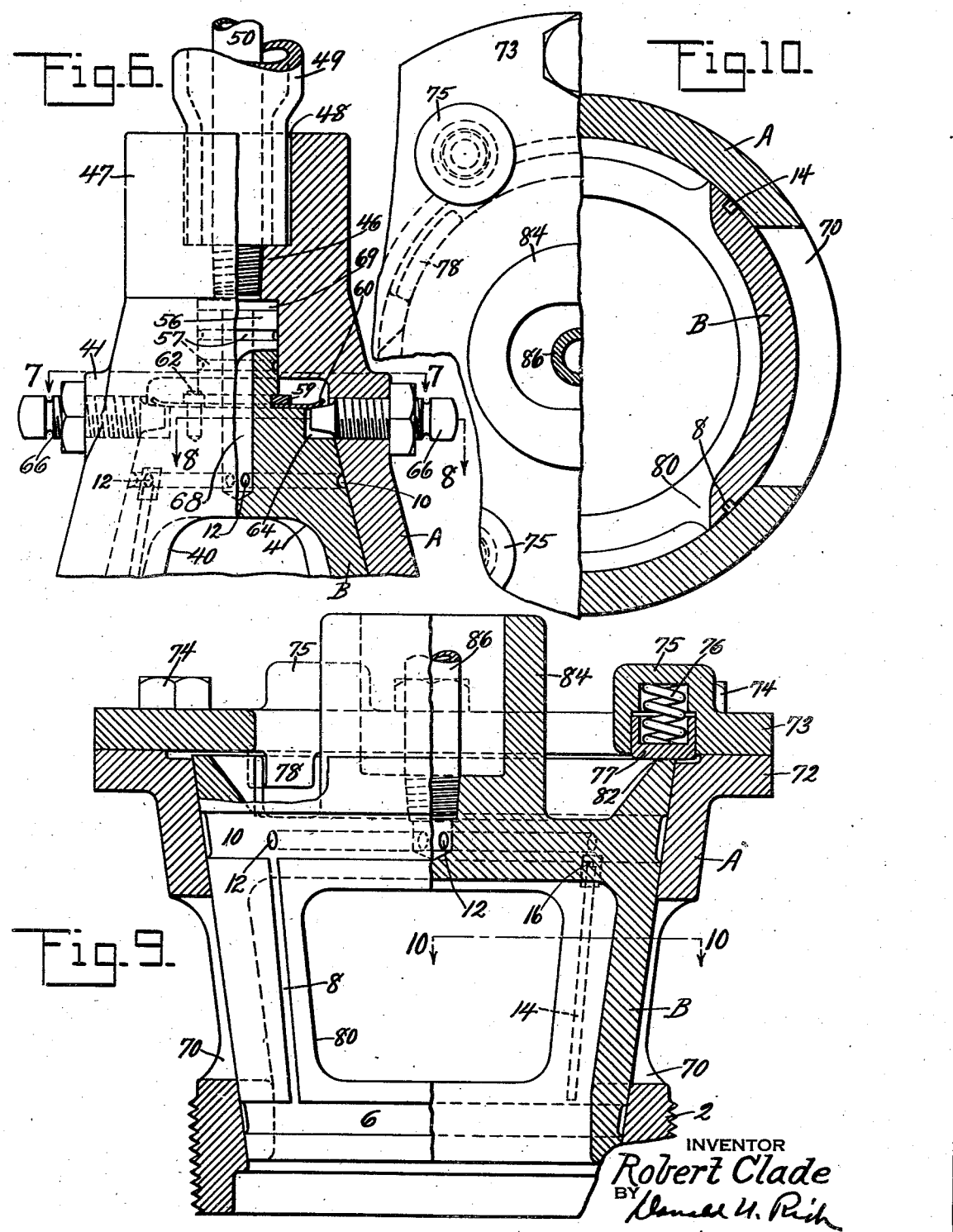
INVENTOR
Robert Clade
BY
ATTORNEY Patented Feb. 27, 1940

2,191,815

UNITED STATES PATENT OFFICE 2,191,815

LUBRICATED TANK VALVE

Robert Clade, Detroit, Mich., assignor to American Car and Foundry Company, New York, N. Y., a corporation of New Jersey Application November 6, 1937, Serial No. 173,067

11 Claims. (Cl. 137—21)

This invention relates to valves in general and in particular to lubricated valves adapted for tank car service. Extreme difficulty has been encountered in the past due to leakage of material past the valve, particularly in cases where the tank is carrying gasoline or extremely light oils. Difficulty has also been encountered with the valves now in use due to the depositing of foreign material on the valve seats, which material will either prevent the valve from completely closing or if the valve is forced to a closed position this material may scratch or otherwise injure the valve seat causing leakage of the lading from the tank. With certain cargoes, particularly those which tend to crystallize, considerable difficulty has been encountered in operating the valves due to the crystallization of material upon the moving parts of the valve. It is an object, therefore, of the invention to provide a valve for tank cars in which all operating parts are fully protected.

A further object of the invention is the provision of a valve for tank cars in which the contacting areas will be thoroughly lubricated and in which the ports will be effectively sealed by lubricant when the valve is in closed position.

A still further object of the invention is the provision of a cone-shaped lubricated valve for tank cars in which the parts may shift slightly relative to each other under action of the lubricant to relieve any wedging tendency of the valve and prevent over lubrication thereof.

These and other objects of the invention will be apparent to persons skilled in the art from a study of the following description and accompanying drawings, in which:

Figure 1 is a sectional view showing one form of the improved valve;

Fig. 2 is a sectional view taken substantially on line 2—2 of Fig. 1;

Fig. 3 is a sectional view taken substantially on line 3—3 of Fig. 1 and showing the port arrangement;

Fig. 4 is a projection of the valve surfaces showing the groove and port arrangement with the valve in open position;

Fig. 5 is a projection of the valve surfaces showing the port and groove arrangement with the valve in closed position;

Fig. 6 is a partial sectional view showing a slight modification of the valve shown in Fig. 1;

Fig. 7 is a sectional view taken substantially on line 7—7 of Fig. 6 and showing the modified securing means;

Fig. 8 is a sectional view taken substantially on line 8—8 of Fig. 6;

Fig. 9 is a sectional view similar to Fig. 1 but showing a further modification, and Fig. 10 is a sectional view taken substantially on line 10—10 of Fig. 9.

Referring now more particularly to the drawings, the valves shown therein are each formed generally of two parts, namely, a body portion A and a plug B, the latter being of tapered form having a closed upper portion and an open lower end portion as shown at D, to permit discharge of lading outside the tank. In the form shown in Fig. 1, the plug is secured at the lower portion of the tank, preferably by having its lower end portion 2 threadedly engaged with the usual tank discharge outlet C, the latter being shown in broken lines.

The sealing surface of the plug B is preferably machined and is provided with discharge ports 4. Adjacent the upper and lower ends of the plug B are annular lubricant arresting grooves 10 and 6 respectively which are connected by means of longitudinal lubricant grooves 8 arranged adjacent one side of each of the ports 4, as shown clearly in Figs. 4 and 5. These grooves 8 are of substantially the same width from end to end so as to permit free passage of lubricant from annular groove 10 into said grooves 8 and then to the lower arresting groove. Along the opposite side of each port 4 are lubricant grooves 14, the lower ends of which terminate short of the arresting groove 6 and the upper ends of which are reduced in diameter by means of scratch grooves 16 which communicate with the upper arresting groove 10.

The upper end portion of the plug B is provided with a bore 18, the lower portion of which is closed by means of a sealing plug 20. Secured to the upper end portion of the body A and depending therefrom into said bore 18 is a hollow tubular lubricant feeder element 22 which may be a bolt or the like, the lower end portion of said element 22 being provided with a head 24 provided with an annular sealing groove 26. As shown clearly in Fig. 1, the head 24 is spaced from the upper portion of the plug 20 to provide a lubricant chamber 27 which receives lubricant under pressure from the feeder element 22 and discharges lubricant therefrom into radial ducts 12 communicating with the annular lubricant groove 10.

The head 24 of the feeder element 22 constitutes a seat for a spring 28, the upper end of which bears against the shoulder 30 formed by the bore 18. The valve body is of general bell-shape having the interior thereof machined to closely engage the machined surface of the valve plug and the interior surface is provided with lubricant control cavities 34 properly located in order that lubricant may be fed to the grooves 8 and 14 at an increased rate when the valve is in certain positions. The upper inner portion of the body is relieved as at 36 in order to provide a cavity between it and the upper portion of the plug and this cavity will be connected by means of a bore 38 with the interior of the plug in order that pressure may not build up between the plug and body as hereinafter described. The bell-shaped body is provided with ports 40 adapted to be alined with plug parts 4 and with a thickened portion 41 adapted to be drilled and tapped to receive dog screw 42 which will be locked in position by a lock nut 43. The inner end of this dog screw is adapted to project into a short groove 44 cut in the upper portion of the conical plug, thus limiting both rotational and separating movements of the plug and body. The upper end of the bell-shaped body is closed by a web 46 from which a projection 47 extends upwardly and this projection is formed with a central cavity 48 substantially elliptical in form which is adapted to receive a suitably formed operating member 49 (Fig. 6). The web is drilled and tapped in order to receive the upper end of bolt 22 and the lower end of lubricant supply pipe 50, which will extend upwardly through the operating means to the tank dome.

The valve will be assembled by placing the body portion over the plug portion in its proper location, inserting the helical spring in the plug bore, after which lubricant feeder element 22 will be screwed into position in the web 46, thus resiliently urging the body toward the plug. With the parts in this position the sealing plug 20 may be inserted to close the plug bore and provide the lubricant distributing cavity between it and the securing bolt head. The body is now turned to such a position as to permit insertion of the dog screw into the plug groove 44, thus limiting the rotational, as well as vertical, movement of the body. It is obvious that the helical spring bearing on the head of the retaining bolt 22 will constantly urge the body into engagement with the plug, but that by forcing lubricant into the chamber between the bolt head and sealing plug 20, a sufficient pressure may be built up which will cause a slight compression of the spring and a shifting of the body away from the plug. As soon as the body shifts away from the plug lubricant could escape from groove 10 into the upper cavity and from this cavity through bore 38 to the interior of the plug. Such an arrangement and operation will prevent an over-lubrication of the valve and the building up of bursting pressures, while at the same time the shifting may be utilized to make the valve more easily operable.

The valve shown in Figs. 6 to 8 inclusive is substantially the same as that just described and accordingly the same reference numerals have been applied wherever possible. In this form the attaching arrangement has been simplified and the plug formed with a central integral projection 56 having sealing grooves 57 and a shoulder groove 58 adapted to receive a retaining U-shaped washer 59. This washer is adapted to hold a spring collar 60 in position and will in turn be held by means of a screw 62. The spring collar or washer 60 has the outer edge thereof deflected upwardly and overlying a pair of short angular shaped grooves 64 cut in the upper corner of the plug, thus forming grooves adapted to receive the inner tapered ends of dog screws 66. The upper end of the plug B, more particularly the projection 56, is provided with a substantially centrally arranged bore 68 constituting a lubricant reservoir or chamber which is in communication with the radial ducts 12 and which receives lubricant under pressure from the lubricant pipe 50. In this form of the invention it is necessary that the web of the bell-shaped body be bored in order to receive the plug projection and this bore is of sufficient depth to provide a lubricant receiving space 69 between the top of the projection and the valve body. Introduction of lubricant into the valve will fill the space 29 as well as the bore 68, the ducts 12 and the lubricant grooves in the seating surface of the plug. It will be apparent that when the valve is fully lubricated, continued insertion of lubrication through pipe 50 into chamber 69 will build up pressure within said chamber 69 sufficient to complete lifting of the body A from the plug B and a separation of the sealing surfaces. When this occurs lubricant between the plug and body will be forced into the ports 4 and the pressure thus reduced and the body reseated on plug B due to the action of the resilient elements or washers 60. The spring washer 60, of course, normally retains the body in its seated position upon the plug, but it is obvious that in this instance the pressure with which the body is urged downwardly may be readily changed by an adjustment of the dog screws.

The form of valve shown in Figs. 9 and 10 is identical with the forms previously described insofar as the groove and cavity arrangement is concerned and, therefore, the same reference numerals have been applied to these figures wherever possible. In this form the plug rotates relative to the body which is secured to the tank outlet and is formed with ports 70 and an upper flange 72 to which the cover plate 73 is attached by suitable means such as bolts 74. The cover plate is formed with a comparatively large central opening surrounded by a plurality of projections 75 which form downwardly facing cups adapted to receive springs 76 and upwardly facing cup-shaped bearing members 77 which bear on the upper rim of the plug and retain it in its seated position. The cover plate is formed on its under surface with a pair of stops 78, one of which is shown, and which will limit the rotation of the valve plug. The valve plug is formed as an integral hollow truncated cone with ports 80 connecting the interior and exterior and adapted to register with the ports of the body. The upper edge 82 of the plug is adapted to have contact with the bearing cups 77 previously referred to and is formed at its center with an upwardly directed projection 84 adapted to receive a suitable operating means such as that shown in Fig. 6. Within this projection is located a pipe 86 which is threaded into the plug and has communication with radial ducts or passageways 12 to distribute lubricant to the various grooves. In this form the grooves 6 and 10 are widened considerably in order to obtain sufficient area to cause a lifting of the valve plug under high lubricant pressure, which lift is permitted by compressing the springs 76. It is thus seen that a conical valve is provided the operation of which is identical with that of the forms previously described but in which the parts may be considered to have been reversed, that is, the body will remain stationary, while the plug rotates instead of the plug remaining stationary with the body rotating as in the case of the two forms previously described.

While the invention has been described more or less in detail, it is obvious that various modifications and rearrangements of parts will be apparent to persons skilled in the art and all such modifications and rearrangements of parts are contemplated as fall within the scope of the following claims.

What is claimed is:

1. A lubricated valve for tank cars and the like comprising a plug secured to the bottom of the tank, a valve body surrounding and resting upon said plug, lubricant passages in said plug, retaining means holding said body and plug in engagement, and means for forcing lubricant into said passages through said retaining means.

2. A lubricated valve for tank cars and the like comprising an inverted conical plug secured to the bottom of the tank, a valve body surrounding and having a conical seat resting upon the plug, lubricant passages supplying lubricant to the surfaces between the plug and body, retaining means holding said body and plug in engagement, and means for forcing lubricant into said passages through said retaining means, said lubricant reacting against said retaining means to cause relative axial movement of the plug and body.

3. A lubricated valve for tank cars and the like comprising an inverted conical plug secured to the bottom of the tank, a valve body surrounding and having a conical seat resting upon the plug, ports in the plug and body, lubricant passages surrounding the plug ports to prevent leakage of material through the closed valve, resilient retaining means forcing said plug and body into engagement, and means for supplying lubricant to the passages through said retaining means and reacting thereagainst to overcome the resilient means and cause relative axial movement of the plug and body.

4. A lubricated valve for tank cars and the like comprising an inverted conical plug secured to the bottom of the tank, a valve body surrounding and having a conical seat resting upon the plug, ports in the plug and body, lubricant passages surrounding the plug ports to prevent leakage of material through the closed valve, retaining means holding said plug and body in engagement, and means for supplying lubricant through the retaining means to the lubricant passages.

5. A valve for tank cars or the like comprising a plug part and a body part, one of said parts being retained against movement by being secured to the lower portion of the tank and the other part being rotatable relative to the first-named part, lubricant grooves in the seating surface of the valve, a lubricant feeding element secured to the body part and extending into the plug part, ducts in the plug part in communication with the lubricant grooves and feeding element, and a feeding pipe secured to the body part and extended upwardly through the tank adapted to feed lubricant under pressure to the feeding element.

6. A valve for tank cars or the like comprising a plug part and a body part, said plug part having ports and an open lower end for discharge of lading therethrough, one of said parts being secured against rotation at the lower portion of the tank and the other part having seated engagement therewith and being rotatable relative thereto, lubricant grooves in the seating surface of the valve, means for feeding lubricant under pressure to said grooves, retaining means secured to the body part and extending into the plug part, and resilient means reacting upon said retaining means and plug to resiliently retain the plug part and body part in seated relation.

7. A valve for tank cars or the like comprising a plug secured at the lower portion of the tank, a body seated on the plug and capable of rotation relative thereto, lubricant grooves in the seating surface of the plug and body, a feeder element secured to the upper end portion of the body for feeding lubricant to said grooves, said element extending into the upper end portion of the plug and having a head at the lower end portion constituting a spring seat, spring means interposed between the plug and spring seat to normally maintain the plug and body in seated relation, and lubricant delivery means secured to the body and extending upwardly through the tank and arranged in communication with the feeder element.

8. A valve for tank cars or the like comprising a plug secured to the lower portion of the tank, a body seated on the plug and capable of rotation relative thereto, the upper end portion of said plug being provided with a bore closed at its lower end, a feeder element secured to the body and extending into said bore with its lower end portion in spaced relation to the closed lower end of said bore whereby to provide a lubricant chamber, means for feeding lubricant under pressure from said chamber to the lubricant grooves, spring means interposed between the plug and said feeder element to retain the body and plug in seated relation, and lubricant delivery means secured to the body and extending upwardly through the tank and arranged in communication with the feeder element.

9. A valve for tank cars or the like comprising a plug seated at the lower end portion of the tank and provided with inlet ports and an open lower end portion for the discharge of lading, a body seated on the plug and capable of rotation relative thereto, said body being provided with ports adapted to be alined with the plug ports, the upper end portion of said plug being provided with an internal bore closed at its lower end, a feeder element secured to the body and extending into said bore with its lower end in spaced relation to the closed lower end of said bore to provide a lubricant chamber, lubricant grooves in the seating surface of the valve, connections between said lubricant chamber and lubricant grooves, and spring means seated on the feeder element and bearing against the plug in such a manner as to constantly urge the plug and body to seated relation, the upper end of said plug being spaced from the adjacent body portion to provide a chamber whereby to permit axial movement of the body relative to the plug upon the development of excess pressure within said lubricant chamber to permit escape of excess lubricant into the interior of the plug upon separation of the plug and body.

10. A lubricated valve for tank cars or the like comprising a ported plug secured to the bottom of the tank and having an open lower end for discharge of lading therethrough, a ported valve body surrounding and seated upon the plug, lubricant grooves in the plug, resilient means located wholly within the plug and retaining said body and plug in seated engagement, and means for forcing lubricant under pressure into said lubricant grooves.

11. A lubricated valve for tank cars or the like comprising a ported plug part and a ported body part, one of said parts being secured at the lower portion of the tank and the other part being seated thereon and being rotatable relative thereto, said plug part being provided with an open lower end for discharge of lading therethrough, lubricant grooves in the seating surface of the valve, retaining means including a resilient means located wholly within the plug and retaining the plug part and body part in seated relation, and means for forcing lubricant under pressure through the retaining means and into said lubricant grooves.

ROBERT CLADE.